(12) United States Patent
Huang et al.

(10) Patent No.: US 11,258,137 B2
(45) Date of Patent: Feb. 22, 2022

(54) ALUMINUM-ION BATTERY

(71) Applicant: INDUSTRIAL TECHNOLOGY RESEARCH INSTITUTE, Hsinchu (TW)

(72) Inventors: Mao-Chia Huang, Taichung (TW); Chien-Chih Chiang, New Taipei (TW); Lu-Yu Wang, Tainan (TW); Feng-Shun Tseng, Kaohsiung (TW); Chang-Chung Yang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 152 days.

(21) Appl. No.: 16/574,313

(22) Filed: Sep. 18, 2019

(65) Prior Publication Data

US 2020/0212401 A1     Jul. 2, 2020

(30) Foreign Application Priority Data

Dec. 28, 2018 (TW) .................................. 107147654

(51) Int. Cl.
    *H01M 2/16*            (2006.01)
    *H01M 10/0585*     (2010.01)
    (Continued)

(52) U.S. Cl.
    CPC ............. *H01M 50/46* (2021.01); *H01M 4/48* (2013.01); *H01M 4/661* (2013.01); *H01M 4/668* (2013.01);
    (Continued)

(58) Field of Classification Search
    CPC .................. H01M 10/054; H01M 50/449–457
    See application file for complete search history.

(56) References Cited

U.S. PATENT DOCUMENTS

| 6,143,441 A | 11/2000 | Zguris et al. |
| 7,175,937 B2 | 2/2007 | Cho et al. |

(Continued)

FOREIGN PATENT DOCUMENTS

| CN | 102569701 A | 7/2012 |
| CN | 102804300 A | 11/2012 |

(Continued)

OTHER PUBLICATIONS

Office Action issued in corresponding Chinese Patent Application No. 201910162386.2 dated Dec. 8, 2020.

(Continued)

*Primary Examiner* — Stephan J Essex
(74) *Attorney, Agent, or Firm* — Birch, Stewart, Kolasch & Birch, LLP (57) ABSTRACT

A metal-ion battery is provided. The metal-ion battery includes a positive electrode, a negative electrode, a separating structure, and an electrolyte, wherein the positive electrode and the negative electrode are separated by the separating structure, and the electrolyte composition is disposed between the positive electrode and the negative electrode. The separating structure includes a first separator, a second separator, and a dielectric layer, wherein the dielectric layer is disposed between the first separator and the second separator. The dielectric layer consists of a dielectric material, and the dielectric material has a dielectric constant from 10 to 200.

18 Claims, 3 Drawing Sheets

(51) Int. Cl.
*H01M 4/48* (2010.01)
*H01M 4/66* (2006.01)
*H01M 50/46* (2021.01)
*H01M 50/44* (2021.01)
*H01M 50/411* (2021.01)
*H01M 50/431* (2021.01)

(52) U.S. Cl.
CPC ..... *H01M 10/0585* (2013.01); *H01M 50/411* (2021.01); *H01M 50/431* (2021.01); *H01M 50/44* (2021.01)

(56) References Cited

U.S. PATENT DOCUMENTS

| | | | |
|---|---|---|---|
| 8,697,290 | B2 | 4/2014 | Babinec et al. |
| 10,003,058 | B2 | 6/2018 | Call et al. |
| 2004/0053123 | A1 | 3/2004 | Chang et al. |
| 2006/0008700 | A1 | 1/2006 | Yong et al. |
| 2011/0157771 | A1 | 6/2011 | Gibson et al. |
| 2017/0338513 | A1* | 11/2017 | Chiang ............. H01M 4/663 |

FOREIGN PATENT DOCUMENTS

| | | | |
|---|---|---|---|
| CN | 103000849 | A * | 3/2013 |
| CN | 103078076 | A | 5/2013 |
| CN | 103000849 | B | 9/2015 |
| CN | 104882579 | A | 9/2015 |
| CN | 107394271 | A | 11/2017 |
| CN | 107431173 | A | 12/2017 |
| TW | I539647 | B | 6/2016 |
| TW | 201820678 | A | 6/2018 |

OTHER PUBLICATIONS

Chen et al. "Improved performance of lithium ion battery separator enabled by co-electrospinning polyimide/poly(vinylidene fluoride-co-hexafluoropropylene) and the incorporation of TiO2-(2-hydroxyethyl methacrylate)"., Journal of Power Sources, vol. 273, 1127-1135, (2015).

Madian et al. "Current Advances in TiO2-Based Nanostructure Electrodes for High Performance Lithium Ion Batteries"., Batteries, vol. 4,7, 36 pages, (2018).

Office Action issued in Taiwanese Patent Application No. 107147654 dated May 9, 2019.

Peng et al. "RSC Advances"., The Royal Society of Chemistry, 8 pages, (2012).

Shao et al. "Nano-TiO2 decorated carbon coating on the separator to physically and chemically suppress the shuttle effect for lithium-sulfur battery"., Journal of Power Sources, vol. 378, 537-545, (2018).

Xi et al. "Membrane Separators Coated by TiO2-PMMA with Low Thermal Shrinkage Rate for Lithium-Ion Batteries"., Int. J. Electrochem. Sci., vol. 12, 5421-5430, (2017).

* cited by examiner

ALUMINUM-ION BATTERY

CROSS REFERENCE TO RELATED APPLICATIONS

The application is based on, and claims priority from, Taiwan Application Serial Number 107147654, filed on Dec. 28, 2018, the disclosure of which is hereby incorporated by reference herein in its entirety.

TECHNICAL FIELD

The disclosure relates to a metal-ion battery.

BACKGROUND

Aluminum is the most abundant metal on earth, and electronic devices that are based on aluminum have the advantage of being inexpensive to produce. Furthermore, aluminum has low flammability and low electronic redox properties. An aluminum-ion battery might offer significant safety improvements.

In general, an aluminum-ion battery consists of an aluminum negative electrode, a separator, a positive electrode and an electrolyte. However, during continuous charging and discharging, the aluminum negative electrode is consumed and the area of the aluminum negative electrode is reduced (even resulting in the occurrence of pitting corrosion and fragmentation of the aluminum negative electrode), due to the deposition and dissolution (accompanied by self-corrosion) of the aluminum negative electrode. As a result, the whole current density is increased, resulting in local heating of the battery core and severe irreversibility. The performance of the battery suffers and its lifespan is reduced.

Therefore, there is a need to develop a novel battery, which reduces or inhibits self-corrosion of the aluminum negative electrode in order to prolong the lifespan and improve performance.

SUMMARY

According to embodiments of the disclosure, the disclosure provides a metal-ion battery. The metal-ion battery includes a positive electrode; a negative electrode; a separating structure, wherein the negative electrode and the positive electrode are separated from each other by the separating structure; and an electrolyte composition. The separating structure consists of a first separator, a second separator, and a dielectric layer, wherein dielectric layer is disposed between the first separator and the second separator, and wherein the dielectric layer consists of a dielectric material, and wherein the dielectric material has a dielectric constant from 10 to 200.

A detailed description is given in the following embodiments with reference to the accompanying drawings.

DETAILED DESCRIPTION

The metal-ion battery of the disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In the drawings, the size, shape, or thickness of some of the elements may be exaggerated and not drawn on scale for illustrative purposes. The disclosure will be described with respect to particular embodiments and with reference to certain drawings but the disclosure is not limited thereto.

The disclosure provides a metal-ion battery. According to embodiments of the disclosure, the metal-ion battery of the disclosure replaces the conventional separator with a separating structure. The separating structure includes two separators and a dielectric layer disposed between the two separators. By means of the separating structure, the electric field uniformity can be improved during discharging the metal-ion battery. As a result, Coulombic efficiency and the capacity of the metal-ion battery can be greatly enhanced, and the occurrence of pitting corrosion and fragmentation of the negative electrode would be avoided, thereby increasing the life cycle of the metal-ion battery.

In addition, regarding to the metal-ion battery which employs graphite as the active material of the positive electrode, the capacity of the metal-ion battery and the amount of the graphite of the positive electrode are in direct proportion. However, when increasing the areal density (weight per unit area) of graphite loaded on the positive electrode to a value more than 10 mg/cm$^2$ in order to enhance the power density of the metal-ion battery, the self-corrosion rate of the negative electrode metal of the metal-ion battery would be greatly increased, resulting in reducing the power density and life cycle of the metal-ion battery. Since the separating structure of the metal-ion battery of the disclosure can enhance the electric field uniformity and reduce the electrical transfer resistance and mass transfer resistance of the metal-ion battery during discharging the metal-ion battery, the positive electrode with a high graphite loading amount is suitable to cooperate with the separating structure, thereby increasing Coulombic efficiency, capacity and life cycle of the metal-ion battery. According to embodiments of the disclosure, the metal-ion battery of the disclosure can be applied in huge energy storage system or mobile vehicle.

According to embodiments of the disclosure, the dielectric layer of the separating structure consists of a dielectric material. Since the dielectric material is directly distributed between the two separators (i.e. the dielectric material directly contacts the two separators, and no adhesive agent exists between the dielectric material and the separator). As a result, the performance of the metal-ion battery would not be deteriorated due to the use of the adhesive agent.

Figure 1:
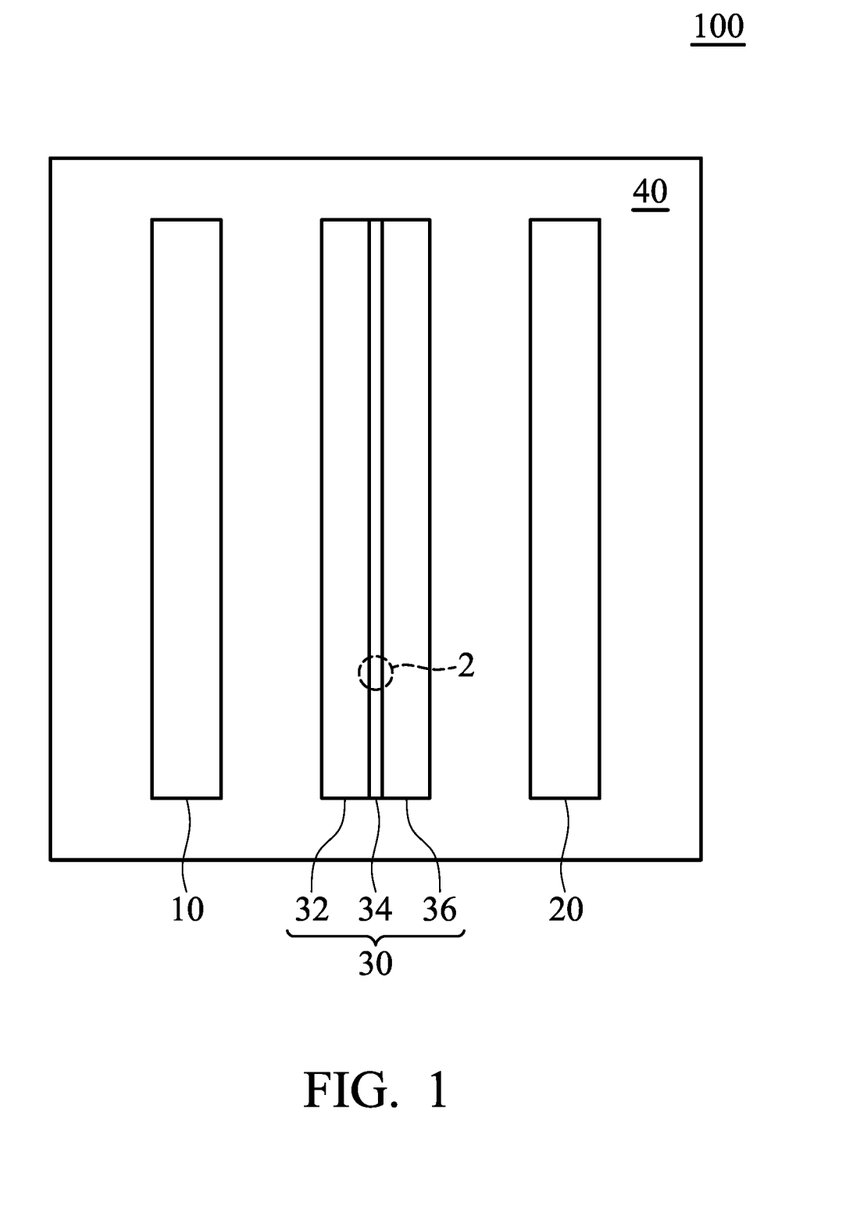
FIG. 1 is a schematic view of the metal-ion battery according to an embodiment of the disclosure.

FIG. 1 is a schematic view of the metal-ion battery 100 according to an embodiment of the disclosure. The metal-ion battery 100 can include a negative electrode 10, a positive electrode 20, a separating structure 30, and an electrolyte composition 40, wherein the separating structure 30 is disposed between the negative electrode 10 and the positive electrode 20. The negative electrode 10 and the positive electrode 20 are separated from each other by the separating structure 30, preventing the positive electrode 20 from coming into direct contact with the negative electrode 10. The electrolyte composition 40 is disposed between the negative electrode 10 and the positive electrode 20. Thus, the electrolyte composition comes into contact with the positive electrode 20 and the negative electrode 10.

According to embodiments of the disclosure, the separating structure 30 can include a first separator 32, a dielectric layer 34, and a second separator 36, wherein the dielectric layer 34 is disposed between the first separator 32 and the second separator 36. According to embodiments of the disclosure, the electrolyte composition 40 is disposed in the metal-ion battery 100 and disposed between the negative electrode 10 and the positive electrode 20, thereby coming into contact with the positive electrode 20 and the negative electrode 10. The metal-ion battery can be a rechargeable secondary battery or it can be a primary battery.

Figure 2:
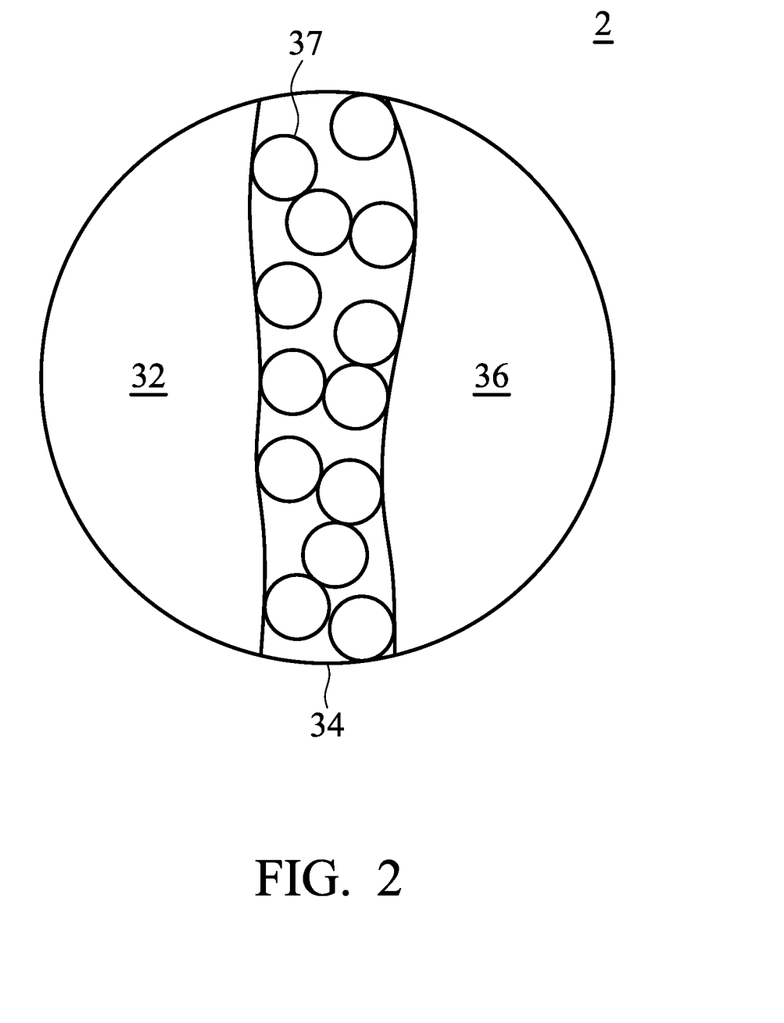
FIG. 2 is a close-up schematic view of the region 2 in the metal-ion battery as shown in FIG. 1.

FIG. 2 is a close-up schematic view of the region 2 in the metal-ion battery 100 as shown in FIG. 1. According to embodiments of the disclosure, the dielectric layer 34 consists of a dielectric material 37 (such as powder, sheet, or strip). According to embodiments of the disclosure, the dielectric material 37 can be a dielectric powder having an average particle size from about 10 nm to 1000 nm, such as about 20 nm, 30 nm, 50 nm, 80 nm, 100 nm, 200 nm, 300 nm, 500 nm, 700 nm, 800 nm, or 900 nm. When the average particle size of the dielectric material 37 is too small, the dielectric material 37 may be separated from the separating structure 30 during operation of the metal-ion battery. When the average particle size of the dielectric material 37 is too large, the energy consumption of the metal-ion battery would be increased. According to embodiments of the disclosure, dielectric layer 34 can have an average thickness from about 20 nm to 5 µm, such as about 30 nm, 50 nm, 80 nm, 100 nm, 200 nm, 300 nm, 500 nm, 700 nm, 800 nm, 900 nm, 1.5 µm, or 3 µm. When the average thickness of the dielectric layer 34 is too thin, the performance of the metal-ion battery would be deteriorated due to the deficiency of electrolyte composition. When the average thickness of the dielectric layer 34 is too thick, the power density of the metal-ion battery would be reduced due to the volume increase thereof. According to embodiments of the disclosure, the dielectric material 37 in the dielectric layer 34 can have an average weight per unit area from about 0.2 mg/cm$^2$ to 4.0 mg/cm$^2$, such as about 0.5 mg/cm$^2$, 0.8 mg/cm$^2$, 1.2 mg/cm$^2$, 1.5 mg/cm$^2$, 1.8 mg/cm$^2$, 2.5 mg/cm$^2$, 2.8 mg/cm$^2$, 3.2 mg/cm$^2$, 3.5 mg/cm$^2$, or 3.8 mg/cm$^2$. When the average weight per unit area of the dielectric material is too low, the separating structure cannot ensure the achievement of electric field uniformity during discharging the metal-ion battery, resulting in reducing the Coulombic efficiency, capacity, and life cycle of the metal-ion battery. When the average weight per unit area of the dielectric material is too high, the energy density by weight of the metal-ion battery would be reduced and the manufacturing cost of the metal-ion battery would be increased.

Figure 3:
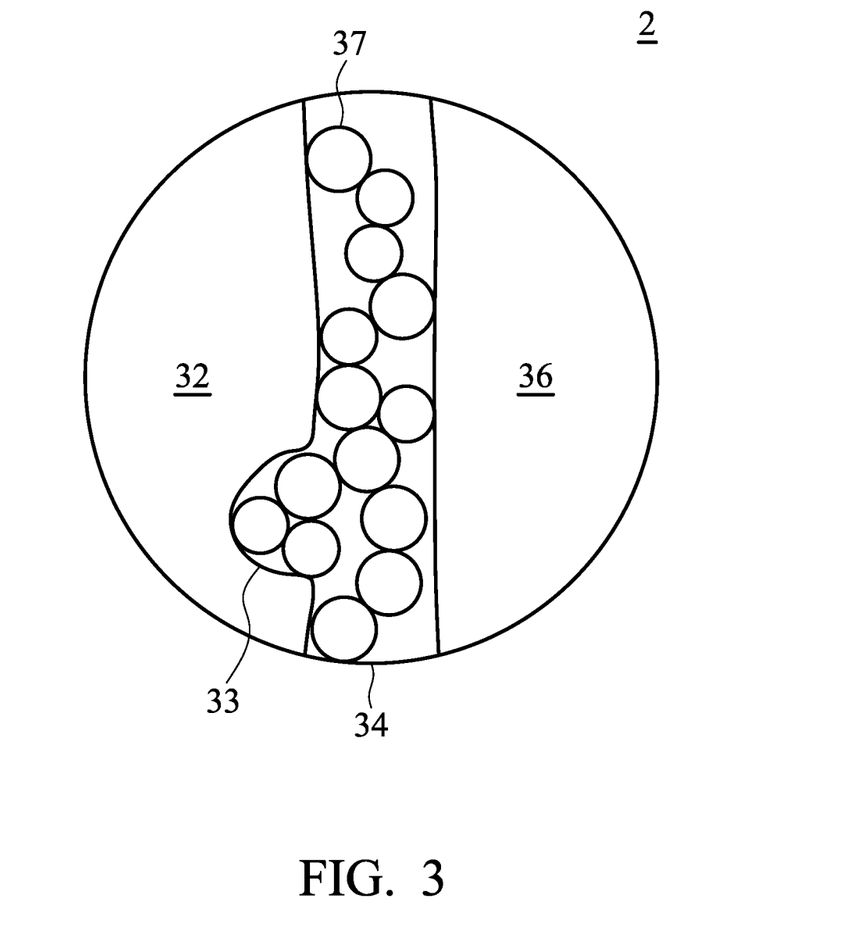
FIG. 3 is a close-up schematic view of the region 2 in the metal-ion battery as shown in FIG. 1 according to another embodiment of the disclosure.

According to embodiments of the disclosure, the first separator 32 and the second separator 36 can be independently glass fiber, polyethylene, polypropylene, nonwoven fabric, wood fiber, poly(ether sulfones), ceramic fiber, or a combination thereof. According to embodiments of the disclosure, the materials of the first separator 32 and the second separator 36 can be the same or different. According to embodiments of the disclosure, the surface of the first separator 32 (and/or the second separator 36), which is adjacent to the dielectric layer 34, can have pores 33 (as show in FIG. 3), and the dielectric material 37 can further fill into the pores 33, thereby enhancing the electric field uniformity during discharging the metal-ion battery. According to embodiments of the disclosure, the dielectric layer 34 can be a continuous layer. According to embodiments of the disclosure, the dielectric layer 34 can be a discontinuous layer.

According to embodiments of the disclosure, the dielectric material of the disclosure can have a dielectric constant from about 10 to 200, such as about 10.4, 22, 30, 35, 80, 114, or 200. When the dielectric constant of the dielectric material is too low, the separating structure cannot ensure the achievement of electric field uniformity during discharging the metal-ion battery, resulting in reducing the Coulombic efficiency, capacity, and life cycle of the metal-ion battery. When the dielectric constant of the dielectric material is too high, the manufacturing cost of the metal-ion battery would be increased. According to embodiments of the disclosure, the dielectric material can be metal oxide with a dielectric constant from 10 to 200, metal nitride with a dielectric constant from 10 to 200, or a combination thereof. According to embodiments of the disclosure, the dielectric material can be rutile phase titanium dioxide, anatase phase titanium dioxide, zirconium dioxide, hafnium oxide, cerium oxide, lanthanum oxide, barium titanate, gallium nitride, or a combination thereof. Table 1 shows the dielectric constant of the above dielectric materials. The dielectric constant of the dielectric material can be determined by the cavity resonator perturbation method (25° C., 10 GHz).

TABLE 1

|  | dielectric constant |
| --- | --- |
| rutile phase titanium dioxide | 114 |
| anatase phase titanium dioxide | 80 |
| zirconium dioxide | 35 |
| hafnium oxide | 30 |
| cerium oxide | 22 |
| lanthanum oxide | 30 |
| barium titanate | 200 |
| gallium nitride | 10.4 |

According to embodiments of the disclosure, the method for preparing the separating structure of the disclosure can include following steps. First, a first separator is provided. Next, a dielectric material is uniformly disposed on the first separator (serving as the first separator of the separating structure), wherein a dielectric layer consists of the dielectric material. Next, a second separator (serving as the second separator of the separating structure) disposed on the dielectric layer, thereby obtaining the separating structure of the disclosure. According to embodiments of the disclosure, after disposing the second separator on the dielectric layer, the stack of the first separator, the dielectric layer and the second separator may be subjected to a pressing process, thereby allowing compaction of the first separator, the dielectric layer, and the second separator.

In addition, according to embodiments of the disclosure, the method for preparing the separating structure of the disclosure can include following steps. A separator is provided, and then the separator is folded. Next, the dielectric material is disposed in the spatial area of the folding separator. Next, the folding separator having the dielectric material can be optionally subjected to a pressing process, obtaining the separating structure of the disclosure. In this embodiment, the first separator and the second separator of the separating structure can be seamless, and at least a part of the edge of the first separator is connected to at least a part of the edge of second separator.

According to embodiments of the disclosure, the negative electrode 10 can include a metal or an alloy of the metal (serving as the active material of the negative electrode). According to embodiments of the disclosure, the metal can be aluminum, copper, iron, zinc, indium, nickel, tin, chromium, yttrium, titanium, manganese, or molybdenum. According to embodiments of the disclosure, the negative electrode 10 can be aluminum foil, and the metal-ion battery can be aluminum-ion battery.

In addition, According to embodiments of the disclosure, the negative electrode 10 can further includes a current-collecting layer (not shown), and the metal or the alloy of the metal is disposed on the current-collecting layer. According to embodiments of the disclosure, current-collecting layer can be a conductive carbon substrate, such as carbon cloth, carbon felt, or carbon paper. For example, the conductive carbon substrate can have a sheet resistance from about 1 $m\Omega \cdot cm^2$ to 6 $m\Omega \cdot cm^2$, and the carbon content of the conductive carbon substrate is greater than about 65 wt %. According to embodiments of the disclosure, the current-collecting layer can be a metal material with a porous structure, such as metal material having a three-dimensional network structure (such as nickel net, copper net, or molybdenum net) or metal material having a foam structure (such as nickel foam, copper foam, or molybdenum foam).

According to embodiments of the disclosure, when the current-collecting layer of the negative electrode is a metal material, the metal material of the current-collecting layer has a relatively low redox activity in comparison with the active material of the negative electrode (the metal or alloy including the metal). According to embodiments of the disclosure, the metal material with a porous structure can have a porosity P from about 50% to 80% (such as about 60%, or 70%). The porosity P can be determined by the following equation: $P=V1/V2\times 100\%$, wherein V1 is the volume of the pores of the current-collecting layer, and V2 is the volume of the current-collecting layer. According to embodiments of the disclosure, the current-collecting layer can be a composite layer of the conductive carbon substrate and a metal material.

According to embodiments of the disclosure, the active material can grow directly on the current-collecting layer (i.e. there is no other layer between the active layer and the current-collecting layer). Furthermore, the metal or the alloy of the metal can be affixed to the current-collecting layer via an adhesive. The adhesive can be polyvinyl alcohol (PVA), polytetrafluoroethylene (PTFE), carboxymethyl cellulose sodium, polyvinylidene difluoride (PVDF), styrene-butadiene copolymer, fluorinated rubber, polyurethane, polyvinylpyrrolidone, poly(ethyl acrylate), polyvinyl chloride, polyacrylonitrile, polybutadiene, polyacrylic acid, or a combination thereof.

According to embodiments of the disclosure, the positive electrode 20 can include a current-collecting layer (not shown) and an active material (not shown) disposed on the current-collecting layer. According to embodiments of the disclosure, the positive electrode can also consist of a current-collecting layer and an active material. According to embodiments of the disclosure, the current-collecting layer can be a conductive carbon substrate, such as carbon cloth, carbon felt, or carbon paper. For example, the conductive carbon substrate can have a sheet resistance from about 1 $m\Omega \cdot cm^2$ to 6 $m\Omega \cdot cm^2$, and the carbon content of the conductive carbon substrate is greater than about 65 wt %. According to embodiments of the disclosure, the current-collecting layer can be a metal material with a porous structure, such as metal material having a three-dimensional network structure (such as nickel net, copper net, or molybdenum net) or metal material having a foam structure (such as nickel foam, copper foam, or molybdenum foam). According to embodiments of the disclosure, the metal material with a porous structure can have a porosity P from about 50% to 80% (such as about 60%, or 70%). According to embodiments of the disclosure, the current-collecting layer can be a composite layer of the conductive carbon substrate and a metal material. According to embodiments of the disclosure, the active material can be layered carbon material, layered double hydroxide, layered oxide, layered chalcogenide, vanadium oxide, metal sulfide, or a combination thereof. According to embodiments of the disclosure, the layered carbon material can be graphite, carbon nanotube, graphene, or a combination thereof. According to embodiments of the disclosure, the layered carbon material can be intercalated carbon material, such as graphite (e.g., natural graphite, electrographite, pyrolytic graphite, foamed graphite, flake graphite, or expanded graphite), graphene, carbon nanotube or a combination thereof. According to embodiments of the disclosure, the active material can grow directly on the current-collecting layer (i.e. there is no other layer between the active layer and the current-collecting layer). For example, the active material can grow directly on the current-collecting layer by chemical vapor deposition (CVD). Furthermore, the active material can be affixed to the current-collecting layer of the positive electrode via an adhesive. The adhesive can be polyvinyl alcohol (PVA), polytetrafluoroethylene (PTFE), carboxymethyl cellulose sodium, polyvinylidene difluoride (PVDF), styrene-butadiene copolymer, fluorinated rubber, polyurethane, polyvinylpyrrolidone, poly(ethyl acrylate), polyvinyl chloride, polyacrylonitrile, polybutadiene, polyacrylic acid, or a combination thereof. According to embodiments of the disclosure, when the current-collecting layer is metal material with a porous structure, the active material of the positive electrode can further fill into the pores of the metal material. According to embodiments of the disclosure, the active material disposed on the current-collecting layer can have an average weight per unit area from about 10 $mg/cm^2$ to 30 $mg/cm^2$, such as about 13 $mg/cm^2$, 15 $mg/cm^2$, 18 $mg/cm^2$, or 20 $mg/cm^2$. Since the separating structure of the metal-ion battery can enhance the electric field uniformity and reduce the electrical transfer resistance and mass transfer resistance of the metal-ion battery during discharging the metal-ion battery, the positive electrode with a high graphite loading amount (the active material can have an average weight per unit area from about 12 $mg/cm^2$ to 30 $mg/cm^2$, 13 $mg/cm^2$ to 30 $mg/cm^2$, 15 $mg/cm^2$ to 30 $mg/cm^2$, or 20 $mg/cm^2$ to 30 $mg/cm^2$) is suitable to cooperate with the separating structure, thereby increasing Coulombic efficiency, capacity and life cycle of the metal-ion battery.

According to embodiments of the disclosure, the electrolyte composition of the disclosure can include an ionic liquid and a metal halide, wherein the molar ratio of the metal halide to the ionic liquid can be about from 1.1:1 to 2.1:1, such as about 1.3:1, 1.4:1, 1.8:1, or 2:1. The metal halide can be aluminum halide, silver halide, copper halide, iron halide, cobalt halide, zinc halide, indium halide, cadmium halide, nickel halide, tin halide, chromium halide, lanthanum halide, yttrium halide, titanium halide, manganese halide, molybdenum halide, or a combination thereof. According to embodiments of the disclosure, the metal halide can be aluminum halidealuminum. The ionic liquid can be alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or a combination thereof. For example, when the metal halide is aluminum halide, the ionic liquid can be 1-ethyl-3-methylimidazolium chloride (EMIC), or 1-butyl-3-methylimidazolium chloride (BMIC). According to embodiments of the disclosure, the electrolyte can further include an additive to increase electrical conductivity, lower the viscosity and the resistance, or enhance the electric field uniformity, thereby increasing Coulombic efficiency of the metal-ion battery. According to embodiments of the disclosure, the electrolyte composition of the disclosure can further include urea, acetamide, choline chloride, ethylchlorine chloride, alkali halide, dimethyl sulfoxide, or a combination thereof.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation of Metal-Ion Battery

Example 1

An aluminum foil (with a thickness of 0.05 mm, manufactured by Alfa Aesar) was cut to obtain the aluminum electrode (having a size of 35 mm×70 mm). Next, two identical separators (six layers of ½ inch glass filter paper, with trade No. Whatman GFA) (having a size of 50 mm×80 mm) were provided. Next, anatase phase titanium dioxide powder (with an average particle size of 20 nm) was disposed on one of the two separators, and the other separator was disposed on the separator to cover the anatase phase titanium dioxide powder, obtaining a separating structure, wherein the anatase phase titanium dioxide powder had an average weight per unit area of about 0.9 mg/cm$^2$. Next, a nickel foam sheet (having a size of 35 mm×70 mm) was provided. Next, 47 parts by weight of natural graphite powder (available from Long Time Tech Corp., with trade No. N58-30K), 1 part by weight of carboxymethyl cellulose sodium (CMC) (available from NIPPON PAPER, with trade No. MAC350HC), 2 parts by weight of styrene-butadiene rubber (SBR) (available from JSR Corporation, with trade No. 104A), and 50 parts by weight of water were mixed, obtaining a coating composition. Next, the coating composition was coated on the nickel foam sheet. After baking the nickel foam sheet at 100° C. for 10 minutes, a graphite electrode was obtained, wherein the graphite electrode had an average weight per unit area (which was controlled by the amount of the coating composition) of 10 mg/cm$^2$. Next, the aluminum electrode (serving as negative electrode), the separating structure, and the graphite electrode (serving as positive electrode) were placed in sequence and sealed within an aluminum plastic pouch. Next, an electrolyte composition (including aluminum chloride (AlCl$_3$) and 1-butyl-3-methylimidazolium chloride (BMIC), wherein the molar ratio between AlCl$_3$ and BMIC was about 1.4) was injected into the aluminum plastic pouch, obtaining Aluminum-ion battery (1).

Next, Aluminum-ion battery (1) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). The results are shown in Table 2.

Example 2

Example 2 was performed in the same manner as Example 1 except that the average weight per unit area of the anatase phase titanium dioxide powder was increased from 0.9 mg/cm$^2$ to 1.4 mg/cm$^2$, obtaining Aluminum-ion battery (2).

Next, Aluminum-ion battery (2) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). The results are shown in Table 2.

Comparative Example 1

Comparative Example 1 was performed in the same manner as Example 1 except that the separating structure was replaced with a separator (six layers of ½ inch glass filter paper, with trade No. Whatman GFA) (having a size of 50 mm×80 mm), obtaining Aluminum-ion battery (3).

Next, Aluminum-ion battery (3) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). The results are shown in Table 2.

Comparative Example 2

Comparative Example 2 was performed in the same manner as Example 1 except that the separating structure was replaced with a separator (six layers of ½ inch glass filter paper, with trade No. Whatman GFA) (having a size of 50 mm×80 mm), and an anatase phase titanium dioxide powder (with an average particle size of 20 nm) was added into the electrolyte composition, obtaining Aluminum-ion battery (4). In particular, the ratio of the weight of the anatase phase titanium dioxide powder to the total weight of the aluminum chloride and 1-butyl-3-methylimidazolium chloride was 0.01:100.

Next, Aluminum-ion battery (4) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). The results are shown in Table 2.

TABLE 2

|  | 0.5 C specific capacity (mAh/g) | 1 C specific capacity (mAh/g) | 2 C specific capacity (mAh/g) | specific capacity on the 90$^{th}$ charging/discharging cycle (mAh/g) |
|---|---|---|---|---|
| Example 1 | 65 | 70 | 67 | 73 |
| Example 2 | 61 | 70 | 67 | 72 |
| Comparative Example 1 | 56 | 69 | 67 | 71 |
| Comparative Example 2 | 60 | 70 | 65 | 70 |

As shown in Table 2, when the graphite electrode had an average weight per unit area of 10 mg/cm$^2$, in comparison with the conventional separator, the separating structure of the disclosure can improve the specific capacity of the aluminum-ion battery.

In addition, as shown in Comparative Example 2, the performance of the aluminum-ion battery would not be improved by adding titanium dioxide into the electrolyte composition (instead of disposing titanium dioxide into the separating structure).

Example 3

An aluminum foil (with a thickness of 0.05 mm, manufactured by Alfa Aesar) was cut to obtain the aluminum electrode (having a size of 35 mm×70 mm). Next, two identical separator (six layers of ½ inch glass filter paper, with trade No. Whatman GFA) (having a size of 50 mm×80 mm) were provided. Next, anatase phase titanium dioxide powder (with an average particle size of 20 nm) was disposed on one of the two separators, and the other separator was disposed on the separator to cover the anatase phase titanium dioxide powder, obtaining a separating structure, wherein the anatase phase titanium dioxide powder had an average weight per unit area of about 0.2 mg/cm$^2$. Next, nickel foam sheet (having a size of 35 mm×70 mm) was provided. Next, 47 parts by weight of natural graphite powder (available from Long Time Tech Corp., with trade No. N58-30K), 1 part by weight of carboxymethyl cellulose sodium (CMC) (available from NIPPON PAPER, with trade No. MAC350HC), 2 parts by weight of styrene-butadiene rubber (SBR) (available from JSR Corporation, with trade No. 104A), and 50 parts by weight of water were mixed, obtaining a coating composition. Next, the coating composition was coated on the nickel foam sheet. After baking the nickel foam sheet at 100° C. for 10 minutes, a graphite electrode was obtained, wherein the graphite electrode had an average weight per unit area of 12 mg/cm$^2$ (which was controlled by the amount of the coating composition). Next, the aluminum electrode (serving as negative electrode), the separating structure, and the graphite electrode (serving as positive electrode) were placed in sequence and sealed within an aluminum plastic pouch. Next, an electrolyte composition (including aluminum chloride (AlCl$_3$) and 1-ethyl-3-methylimidazolium chloride (EMIC), wherein the molar ratio between AlCl$_3$ and EMIC was about 1.4) was injected into the aluminum plastic pouch, obtaining Aluminum-ion battery (5).

Next, Aluminum-ion battery (5) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). Further, the number of the charging/discharging cycles was determined when Coulombic efficiency of Aluminum-ion battery (5) was lower than 80%. The results are shown in Table 3.

Comparative Example 3

Comparative Example 3 was performed in the same manner as Example 3 except that the separating structure was replaced with a separator (six layers of ½ inch glass filter paper, with trade No. Whatman GFA) (having a size of 50 mm×80 mm), obtaining Aluminum-ion battery (6).

Next, Aluminum-ion battery (6) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). Further, the number of the charging/discharging cycles was determined when Coulombic efficiency of Aluminum-ion battery (6) was lower than 80%. The results are shown in Table 3.

TABLE 3

|  | 0.5 C specific capacity (mAh/g) | 1 C specific capacity (mAh/g) | 2 C specific capacity (mAh/g) | specific capacity on the 90$^{th}$ charging/discharging cycle (mAh/g) | the number of the charging/discharging cycles when Coulombic efficiency lower than 80% |
|---|---|---|---|---|---|
| Example 3 | 78 | 78 | 71 | 44 | 82 |
| Comparative Example 3 | 78 | 78 | 70 | 24 | 78 |

As shown in Table 3, when the graphite electrode had an average weight per unit area of 12 mg/cm$^2$, the specific capacity (on the 90$^{th}$ charging/discharging cycle) of Aluminum-ion battery (5) (which employed the separating structure substituting for the conventional separator) of Example 3 is about 2 times higher than that of Aluminum-ion battery (6) of Comparative Example 3. Further, Aluminum-ion battery (5) exhibits relatively high life cycle.

Example 4

An aluminum foil (with a thickness of 0.05 mm, manufactured by Alfa Aesar) was cut to obtain the aluminum electrode (having a size of 35 mm×70 mm). Next, two identical separator (six layers of ½ inch glass filter paper, with trade No. Whatman GFA) (50 mm×80 mm) were provided. Next, anatase phase titanium dioxide powder (with an average particle size of 20 nm) was disposed on one of the two separators, and the other separator was disposed on the separator to cover the anatase phase titanium dioxide powder, obtaining a separating structure, wherein the anatase phase titanium dioxide powder had an average weight per unit area of about 0.9 mg/cm$^2$. Next, nickel foam sheet (having a size of 35 mm×70 mm) was provided. Next, 47 parts by weight of natural graphite powder (available from Long Time Tech Corp., with trade No. N58-30K), 1 part by weight of carboxymethyl cellulose sodium (CMC) (available from NIPPON PAPER, with trade No. MAC350HC), 2 parts by weight of styrene-butadiene rubber (SBR) (available from JSR Corporation, with trade No. 104A), and 50 parts by weight of water were mixed, obtaining a coating composition. Next, the coating composition was coated on the nickel foam sheet. After baking the nickel foam sheet at 100° C. for 10 minutes, a graphite electrode was obtained, wherein the graphite electrode had an average weight per unit area of 13 mg/cm² (which was controlled by the amount of the coating composition). Next, the aluminum electrode (serving as negative electrode), the separating structure, and the graphite electrode (serving as positive electrode) were placed in sequence and sealed within an aluminum plastic pouch. Next, an electrolyte composition (including aluminum chloride ($AlCl_3$) and 1-ethyl-3-methylimidazolium chloride (EMIC), wherein the molar ratio between $AlCl_3$ and EMIC was about 1.4) was injected into the aluminum plastic pouch, obtaining Aluminum-ion battery (7).

Next, Aluminum-ion battery (7) was then charged and discharged at charge/discharge rate of 0.5 C, 1 C, and 2 C individually by a MTI battery analyzer (BST8-WA) to analyze the specific capacity and the specific capacity on the $90^{th}$ charging/discharging cycle (at charge/discharge rate of 1 C). Further, the number of the charging/discharging cycles was determined when Coulombic efficiency of Aluminum-ion battery (7) was lower than 80%. The results are shown in Table 4.

Example 5

Example 5 was performed in the same manner as Example 4 except that the average weight per unit area of the anatase phase titanium dioxide powder was increased from 0.9 mg/cm² to 1.4 mg/cm², obtaining Aluminum-ion battery (8).

Next, Aluminum-ion battery (8) was then charged and discharged at charge/discharge rate of 0.5 C, 1 C, and 2 C individually by a MTI battery analyzer (BST8-WA) to analyze the specific capacity and the specific capacity on the $90^{th}$ charging/discharging cycle (at charge/discharge rate of 1 C). Further, the number of the charging/discharging cycles was determined when Coulombic efficiency of Aluminum-ion battery (8) was lower than 80%. The results are shown in Table 4.

Example 6

Example 6 was performed in the same manner as Example 4 except that the average weight per unit area of the anatase phase titanium dioxide powder was increased from 0.9 mg/cm² to 2.0 mg/cm², obtaining Aluminum-ion battery (9).

Next, Aluminum-ion battery (9) was then charged and discharged at charge/discharge rate of 0.5 C, 1 C, and 2 C individually by a MTI battery analyzer (BST8-WA) to analyze the specific capacity and the specific capacity on the $90^{th}$ charging/discharging cycle (at charge/discharge rate of 1 C). Further, the number of the charging/discharging cycles was determined when Coulombic efficiency of Aluminum-ion battery (9) was lower than 80%. The results are shown in Table 4.

Example 7

Example 7 was performed in the same manner as Example 4 except that the average weight per unit area of the anatase phase titanium dioxide powder was increased from 0.9 mg/cm² to 3.2 mg/cm², obtaining Aluminum-ion battery (10).

Next, Aluminum-ion battery (10) was then charged and discharged at charge/discharge rate of 0.5 C, 1 C, and 2 C individually by a MTI battery analyzer (BST8-WA) to analyze the specific capacity and the specific capacity on the $90^{th}$ charging/discharging cycle (at charge/discharge rate of 1 C). Further, the number of the charging/discharging cycles was determined when Coulombic efficiency of Aluminum-ion battery (10) was lower than 80%. The results are shown in Table 4.

Comparative Example 4

Comparative Example 4 was performed in the same manner as Example 4 except that the separating structure was replaced with a separator (six layers of ½ inch glass filter paper, with trade No. Whatman GFA) (having a size of 50 mm×80 mm), obtaining Aluminum-ion battery (11).

Next, Aluminum-ion battery (11) was then charged and discharged at charge/discharge rate of 0.5 C, 1 C, and 2 C individually by a MTI battery analyzer (BST8-WA) to analyze the specific capacity and the specific capacity on the $90^{th}$ charging/discharging cycle (at charge/discharge rate of 1 C). Further, the number of the charging/discharging cycles was determined when Coulombic efficiency of Aluminum-ion battery (11) was lower than 80%. The results are shown in Table 4.

Comparative Example 5

Comparative Example 5 was performed in the same manner as Example 4 except that the anatase phase titanium dioxide powder was replaced with silicon dioxide powder (with an average particle size of 20 nm, and a dielectric constant of 3.9), obtaining Aluminum-ion battery (12).

Next, Aluminum-ion battery (12) was then charged and discharged at charge/discharge rate of 0.5 C, 1 C, and 2 C individually by a MTI battery analyzer (BST8-WA) to analyze the specific capacity and the specific capacity on the $90^{th}$ charging/discharging cycle (at charge/discharge rate of 1 C). The results are shown in Table 4.

Comparative Example 6

An aluminum foil (with a thickness of 0.05 mm, manufactured by Alfa Aesar) was cut to obtain the aluminum electrode (having a size of 35 mm×70 mm). Next, two identical separator (six layers of ½ inch glass filter paper, with trade No. Whatman GFA) (having a size of 50 mm×80 mm) were provided. Next, 45 parts by weight of anatase phase titanium dioxide powder (with an average particle size of 20 nm), 1 part by weight of carboxymethyl cellulose sodium (CMC) (available from NIPPON PAPER, with trade No. MAC350HC), 2 parts by weight of styrene-butadiene rubber (SBR) (available from JSR Corporation, with trade No. 104A), and 50 parts by weight of water were mixed, obtaining a coating composition. Next, the coating composition was disposed on one of the two separators, and the other separator was disposed on the separator to cover the coating composition. After baking the nickel foam sheet at 100° C. for 10 minutes, obtaining a separating structure, wherein the anatase phase titanium dioxide powder had an average weight per unit area of about 0.9 mg/cm$^2$. Next, nickel foam sheet (having a size of 35 mm×70 mm) was provided. Next, 47 parts by weight of natural graphite powder (available from Long Time Tech Corp., with trade No. N58-30K), 1 part by weight of carboxymethyl cellulose sodium (CMC) (available from NIPPON PAPER, with trade No. MAC350HC), 2 parts by weight of styrene-butadiene rubber (SBR) (available from JSR Corporation, with trade No. 104A), and 50 parts by weight of water were mixed, obtaining a coating composition. Next, the coating composition was coated on the nickel foam sheet. After baking the nickel foam sheet at 100° C. for 10 minutes, a graphite electrode was obtained, wherein the graphite electrode had an average weight per unit area of 13 mg/cm$^2$ (which was controlled by the amount of the coating composition). Next, the aluminum electrode (serving as negative electrode), the separating structure, and the graphite electrode (serving as positive electrode) were placed in sequence and sealed within an aluminum plastic pouch. Next, an electrolyte composition (including aluminum chloride (AlCl$_3$) and 1-ethyl-3-methylimidazolium chloride (EMIC), wherein the molar ratio between AlCl$_3$ and EMIC was about 1.4) was injected into the aluminum plastic pouch, obtaining Aluminum-ion battery (13).

Next, Aluminum-ion battery (13) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). Further, the number of the charging/discharging cycles was determined when Coulombic efficiency of Aluminum-ion battery (13) was lower than 80%. The results are shown in Table 4.

battery (13) (titanium dioxide was fixed between two separators by the adhesive) of Comparative Example 6.

Example 8

Example 8 was performed in the same manner as Example 4 except that the anatase phase titanium dioxide powder with the average particle size of 20 nm was replaced with the anatase phase titanium dioxide powder with the average particle size of 100 nm, obtaining Aluminum-ion battery (14).

Next, Aluminum-ion battery (14) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). Further, the number of the charging/discharging cycles was determined when Coulombic efficiency of Aluminum-ion battery (14) was lower than 80%. The results are shown in Table 5.

Example 9

Example 9 was performed in the same manner as Example 4 except that the anatase phase titanium dioxide powder with the average particle size of 20 nm was replaced with the anatase phase titanium dioxide powder with the average particle size of 200 nm, obtaining Aluminum-ion battery (15).

Next, Aluminum-ion battery (15) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). Further, the number of the charging/discharging cycles was determined when Coulombic efficiency of Aluminum-ion battery (15) was lower than 80%. The results are shown in Table 5.

Example 10

Example 10 was performed in the same manner as Example 4 except that the anatase phase titanium dioxide

TABLE 4

|  | 0.5 C specific capacity (mAh/g) | 1 C specific capacity (mAh/g) | 2 C specific capacity (mAh/g) | specific capacity on the 90$^{th}$ charging/discharging cycle (mAh/g) | the number of the charging/discharging cycles when Coulombic efficiency lower than 80% |
|---|---|---|---|---|---|
| Example 4 | 72 | 72 | 64 | 69 | >400 |
| Example 5 | 73 | 73 | 66 | 70 | >400 |
| Example 6 | 73 | 73 | 67 | 68 | >400 |
| Example 7 | 70 | 72 | 66 | 71 | >400 |
| Comparative Example 4 | 71 | 63 | 47 | 45 | 220 |
| Comparative Example 5 | 62 | 50 | 32 | 50 | — |
| Comparative Example 6 | 40 | 60 | 25 | 15 | 70 |

As shown in Table 4, when the graphite electrode had an average weight per unit area of 13 mg/cm$^2$, the specific capacity (at charge/discharge rate of 2 C) of the aluminum-ion batteries (which employed the separating structure substituting for the conventional separator) of Examples 4-7 is about 2 times higher than that of Aluminum-ion battery (12) of Comparative Example 5. Further, the life cycles of the aluminum-ion batteries of Examples 4-7 are improved (Coulombic efficiency was greater than 80% on the 400th charging/discharging cycle) in comparison with Aluminum-ion powder with the average particle size of 20 nm was replaced with the rutile phase titanium dioxide powder with the average particle size of 20 nm, obtaining Aluminum-ion battery (16).

Next, Aluminum-ion battery (16) was then charged and discharged at charge/discharge rate of 0.5 C, 1 C, and 2 C individually by a MTI battery analyzer (BST8-WA) to analyze the specific capacity and the specific capacity on the 90$^{th}$ charging/discharging cycle (at charge/discharge rate of 1 C). The results are shown in Table 5.

TABLE 5

|  | 0.5 C specific capacity (mAh/g) | 1 C specific capacity (mAh/g) | 2 C specific capacity (mAh/g) | specific capacity on the 90$^{th}$ charging/ discharging cycle (mAh/g) | the number of the charging/discharging cycles when Coulombic efficiency lower than 80% |
|---|---|---|---|---|---|
| Example 8 | 72 | 71 | 65 | 68 | ~390 |
| Example 9 | 70 | 70 | 63 | 67 | ~370 |
| Example 10 | 70 | 70 | 65 | 69 | — |

It will be clear that various modifications and variations can be made to the disclosed methods and materials. It is intended that the specification and examples be considered as exemplary only, with the true scope of the disclosure being indicated by the following claims and their equivalents.

What is claimed is:

1. An aluminum-ion battery, comprising:
a positive electrode;
a negative electrode, wherein the negative electrode comprises a metal or an alloy of the metal, and wherein the metal is aluminum;
a separating structure, wherein the negative electrode and the positive electrode are separated from each other by the separating structure; and
an electrolyte composition, wherein the electrolyte composition is disposed between the positive electrode and the negative electrode,
wherein the separating structure consists of a first separator, a second separator, and a dielectric layer, wherein the dielectric layer is disposed between the first separator and the second separator, and the dielectric layer consists of a dielectric material, wherein the dielectric material has a dielectric constant from 10 to 200.

2. The aluminum-ion battery as claimed in claim 1, wherein the dielectric material is metal oxide, metal nitride, or a combination thereof.

3. The aluminum-ion battery as claimed in claim 1, wherein the dielectric material is rutile phase titanium dioxide, anatase phase titanium dioxide, zirconium dioxide, hafnium oxide, cerium oxide, lanthanum oxide, barium titanate, gallium nitride, or a combination thereof.

4. The aluminum-ion battery as claimed in claim 1, wherein the dielectric material has a particle size from 10 nm to 1000 nm.

5. The aluminum-ion battery as claimed in claim 1, wherein the dielectric material of the dielectric layer has an average weight per unit area from 0.2 mg/cm$^2$ to 4.0 mg/cm$^2$.

6. The aluminum-ion battery as claimed in claim 1, wherein the first separator and the second separator are independently glass fiber, polyethylene, polypropylene, nonwoven fabric, wood fiber, poly(ether sulfones), ceramic fiber, or a combination thereof.

7. The aluminum-ion battery as claimed in claim 1, wherein at least a part of the edge of the first separator is connected to at least a part of the edge of second separator.

8. The aluminum-ion battery as claimed in claim 1, wherein the positive electrode consists of a current-collecting layer and an active material.

9. The aluminum-ion battery as claimed in claim 8, wherein the active material is disposed on the current-collecting layer, and the active material disposed on the current-collecting layer has an average weight per unit area from 10 mg/cm$^2$ to 30 mg/cm$^2$.

10. The aluminum-ion battery as claimed in claim 8, wherein the current-collecting layer is conductive carbon substrate, metal material with a porous structure, or a combination thereof.

11. The aluminum-ion battery as claimed in claim 10, wherein the conductive carbon substrate is carbon cloth, carbon felt, or carbon paper.

12. The aluminum-ion battery as claimed in claim 8, wherein the active material is layered carbon material, layered double hydroxide, layered oxide, layered chalcogenide, vanadium oxide, metal sulfide or a combination thereof.

13. The aluminum-ion battery as claimed in claim 12, wherein the layered carbon material is graphite, carbon nanotube, graphene, or a combination thereof.

14. The aluminum-ion battery as claimed in claim 13, wherein the graphite is natural graphite, electrographite, pyrolytic graphite, foamed graphite, flake graphite, expanded graphite, or a combination thereof.

15. The aluminum-ion battery as claimed in claim 1, wherein the electrolyte composition comprises an ionic liquid and a metal halide, wherein the molar ratio of the metal halide to the ionic liquid is from 1.1:1 to 2.1:1.

16. The aluminum-ion battery as claimed in claim 15, wherein the metal halide is aluminum halide, silver halide, copper halide, iron halide, cobalt halide, zinc halide, indium halide, cadmium halide, nickel halide, tin halide, chromium halide, lanthanum halide, yttrium halide, titanium halide, manganese halide, molybdenum halide, or a combination thereof.

17. The aluminum-ion battery as claimed in claim 15, wherein the ionic liquid comprises alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or a combination thereof.

18. The aluminum-ion battery as claimed in claim 16, wherein the electrolyte composition further comprises urea, acetamide, choline chloride, ethylchlorine chloride, alkali halide, dimethyl sulfoxide, or a combination thereof.

* * * * *